(12) United States Patent
Sayed et al.

(10) Patent No.: US 10,846,292 B2
(45) Date of Patent: Nov. 24, 2020

(54) EVENT BASED OBJECT RANKING IN A DYNAMIC SYSTEM

(71) Applicant: VMware, Inc., Palo Alto, CA (US)

(72) Inventors: Imran Q. Sayed, San Carlos, CA (US); Adwait Sathye, Cupertino, CA (US)

(73) Assignee: VMware, Inc., Palo Alto, CA (US)

(*) Notice: Subject to any disclaimer, the term of this patent is extended or adjusted under 35 U.S.C. 154(b) by 313 days.

(21) Appl. No.: 13/828,409

(22) Filed: Mar. 14, 2013

(65) Prior Publication Data

US 2014/0280083 A1 Sep. 18, 2014

(51) Int. Cl.
*G06F 16/2457* (2019.01)
*G06F 16/951* (2019.01)

(52) U.S. Cl.
CPC .............................. *G06F 16/24578* (2019.01)

(58) Field of Classification Search
None
See application file for complete search history.

(56) References Cited

U.S. PATENT DOCUMENTS

| | | | |
|---|---|---|---|
| 7,599,918 B2 | 10/2009 | Shen et al. | |
| 8,341,148 B1* | 12/2012 | Needham et al. | 707/725 |
| 8,516,575 B2 | 8/2013 | Burnside et al. | |
| 2004/0111302 A1* | 6/2004 | Falk et al. | 705/4 |
| 2004/0199828 A1* | 10/2004 | Cabezas | G06F 11/0748 |
| | | | 714/39 |
| 2005/0071328 A1* | 3/2005 | Lawrence | G06F 17/3053 |
| 2005/0138486 A1* | 6/2005 | Gromyko | G06Q 10/10 |
| | | | 714/49 |
| 2006/0136504 A1* | 6/2006 | Babutzka et al. | 707/201 |
| 2006/0224587 A1* | 10/2006 | Zamir | G06F 16/9535 |
| 2007/0033183 A1* | 2/2007 | Friedman | G06F 11/3438 |
| 2007/0033275 A1* | 2/2007 | Toivonen et al. | 709/224 |
| 2007/0073580 A1* | 3/2007 | Perry | G06Q 30/0255 |
| | | | 705/14.53 |
| 2007/0156647 A1* | 7/2007 | Shen et al. | 707/3 |
| 2007/0192085 A1* | 8/2007 | Roulland | G06F 17/30684 |
| | | | 704/9 |
| 2007/0282797 A1* | 12/2007 | Wang | G06F 17/30867 |
| 2008/0270355 A1* | 10/2008 | Patel | G06F 16/9535 |
| 2010/0235879 A1* | 9/2010 | Burnside et al. | 726/1 |
| 2011/0119262 A1* | 5/2011 | Dexter | G06F 17/30011 |
| | | | 707/726 |
| 2013/0024431 A1* | 1/2013 | Parthasarathy et al. | 707/692 |
| 2013/0060744 A1* | 3/2013 | Roychoudhuri et al. | 707/706 |

* cited by examiner

*Primary Examiner* — Usmaan Saeed
*Assistant Examiner* — Yu Zhao

(57) ABSTRACT

A method of event based object ranking is described. An object query is computed based upon a user action. The results of the query are ranked based on one or more events associated with objects in the results to create ranked results. The ranked results are provided to the user in response to the query.

18 Claims, 4 Drawing Sheets

300

```
RESULTS
   204a

1. QUERY RESULT
2. QUERY RESULT
3. QUERY RESULT
4. QUERY RESULT
5. NON-QUERY RESULT
.
.
.
n. QUERY RESULT
```

```
RANKED RESULTS
     210

5. NON-QUERY RESULT
2. QUERY RESULT
4. QUERY RESULT
1. QUERY RESULT
n. QUERY RESULT
.
.
.
3. QUERY RESULT
```

EVENT BASED OBJECT RANKING IN A DYNAMIC SYSTEM

BACKGROUND

Many entities maintain and manage computing environments for their users. These computing environments may, for example include many physical and virtual machines that are coupled to one another in a network, and are managed centrally by one or more Information Technology (IT) professionals. Computing environment monitoring is often provided by the IT professional in order to maintain, update and resolve issues stemming from the physical or virtual machines.

For example, when a machine is experiencing an issue, the issue along with machine identification information may be provided to a datacenter management application. Often, the IT professional will access the datacenter management application to learn about the issue. Sometimes, the IT professional must gather data from disjointed sets of data maintained in separate datacenter management applications in an attempt to monitor each of the physical and/or virtual machines in the computing environment. This task this can be even more difficult when there are a large number of IT assets to be managed.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Figure 1:
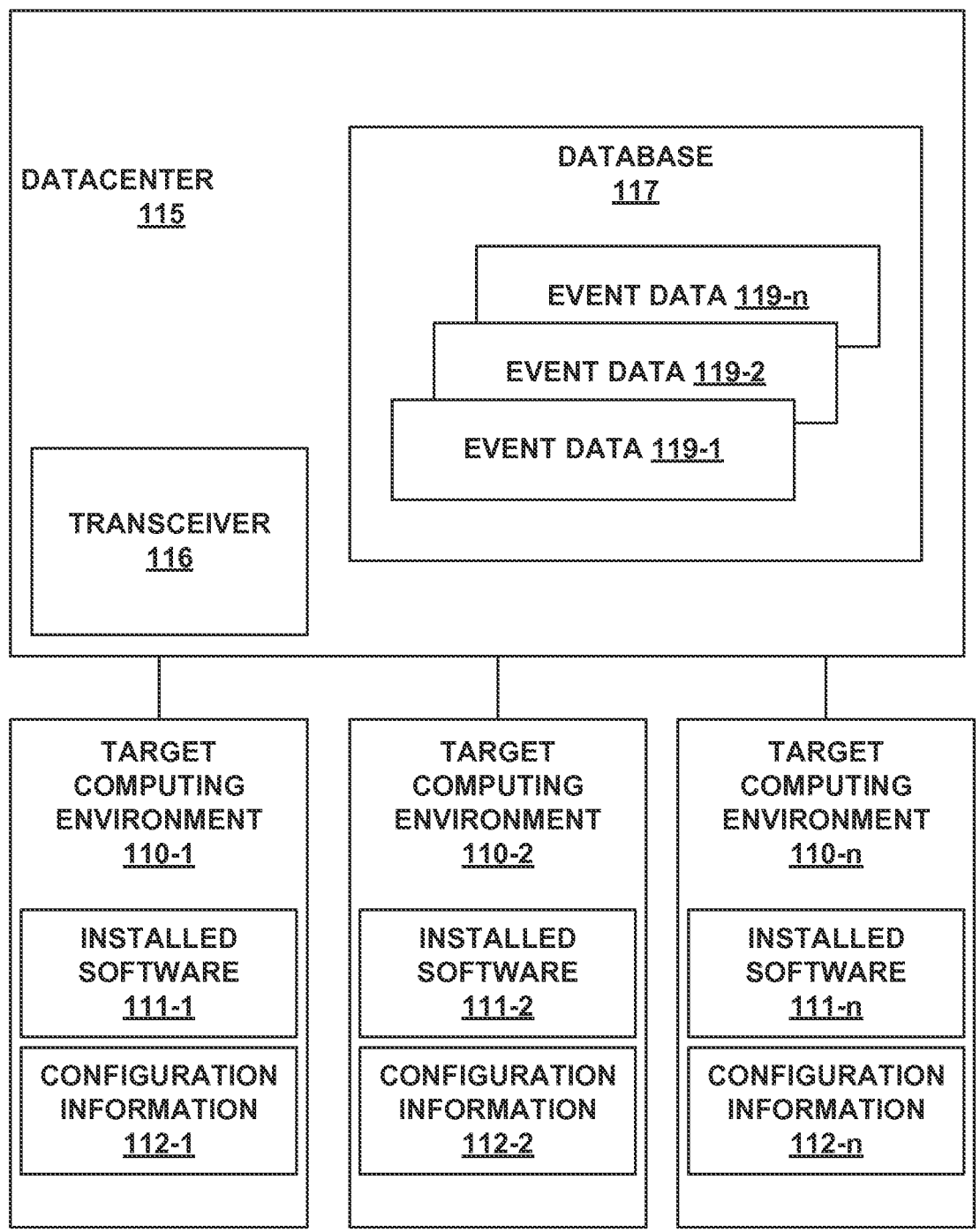
FIG. 1 is an example block diagram that illustrates a datacenter 115 that provides an IT management location for monitoring and storing events for a target computing environment 110, in accordance with an embodiment.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "assigning," "computing," "observing," "providing," "ranking," "receiving," "re-ranking," or the like, often refer to the actions and processes of an electronic computing device or system, such as one or more physical and/or virtual machines, of a target computing environment. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

In the following discussion, various systems, methods and techniques for event based object ranking in a dynamic system are described. For example, assume a user is reviewing a collection of data concerned with a certain class of objects, such as the entities in a datacenter, e.g., virtual machines, physical hosts, network and storage devices, and the like. Instead of providing the objects in an arbitrary or date-centric format, the objects are ranked on events associated with the objects. That way, even when the user is not looking to fix a reported issue, attention is brought to certain items while also allowing the user to quickly understand how the system is behaving, help them find the objects of their interest more easily, and the like.

The ranking system additionally applies where the collection is obtained from a distributed system (e.g., where the data resides in multiple databases). For example, in a distributed system it is computationally expensive to produce a result set containing hundreds or even thousands of items sorted on an arbitrary property and such large collections of data are also nearly useless for the user. However, providing only the top few items based on one or more importance measures is both computationally cheaper and more likely to surface the items that would most likely be of user interest.

Herein various actions and outputs are ascribed to or provided by access for a "user" in a target computing environment. It should be appreciated that such a "user" is typically an IT professional or other person who performs IT management functions within a target computing environment. In some instances a "user" may be any authorized person of an IT management team/staff associated with a target computing environment.

Example Target Computing Environment

FIG. 1 is an example block diagram that illustrates a datacenter 115 that provides an IT management location for monitoring and storing events for a target computing environment 110, in accordance with an embodiment. FIG. 1 also illustrates a plurality of example target computing environments 110 (110-1, 110-2 . . . 110-n) which are accessing functionality of datacenter 115, in accordance with embodiments.

For the purposes of this discussion, datacenter 115 is a device comprising at least one processor and memory; datacenter 115 may be coupled with one or more public and/or private networks. Datacenter 115 may be implemented as a cloud-based entity. Datacenter 115 typically couples with a virtual or physical entity in a target computing environment 110 through a network connection which may be a public network connection, private network connection, or some combination thereof. For example, a user in target computing environment 110 may couple via an Internet connection with datacenter 115 by accessing a web page or application presented by datacenter 115 at a virtual or physical entity within target computing environment 110.

Datacenter 115, in one embodiment, includes a transceiver 116 and a database 117. Transceiver 116 operates to send data to and receive data from a target computing environment 110 that has accessed datacenter 115. Database 117 provides storage and organization for event data 119 (119-1, 119-2 . . . 119-n, in this example) that is received from an event that occurs within a target computing environment 110.

Example Target Computing Environment

With reference again to FIG. 1, a plurality of target computing environments 110 (110-1, 110-2, 110-n) are shown. Each target computing environment comprises a plurality of installed software 111 (111-1, 111-2, 111-n) and configuration information 112 (112-1, 112-2, 112-n). Embodiments of the illustrated example are scalable, and it should be appreciated that a greater or lesser number of target computing environments 110 may be coupled with datacenter 115 at a particular instant in time. A particular target computing environment 110 (110-1, 110-2, 110-n), such as target computing environment 110-1, may include a plurality of physical and virtual machines which are coupled with one another in some configuration, and which are typically remotely accessible to an IT professional and/or other user who manages these physical and virtual machines. Such management may include managing one or more of installed software 111-1, configuration information 112-1, operational characteristics of the target computing environment 110, and the like.

Example Target Computing Event Monitoring

Datacenter 115 is operable to monitor target computing environments 110 (110-1, 110-2, 110-n) for events. In general, an event may be any change to the target computing environment or documents within target computing environment 110. For example, powering on or off of virtual machines, errors, the number of times an object is viewed or browsed, and the like.

As can be seen, event monitoring involves collecting data from a device belonging to a target computing environment 110 or having access to the target computing environment 110. In one embodiment, event monitoring utilizes an agentless event monitor to collect event data 119. In an embodiment, an agentless event monitor is a local executable stored in temporary storage of a target computing environment 110 (e.g., an agentless event monitor is a dissolving agent that does not persist in storage after an event review has completed). It should be appreciated that although an installed version of the agentless event monitor does not persist in storage; the executable may be cached and reused on subsequent executions.

In another embodiment, event monitor utilizes an agent, such as an event monitor utility that may be installed as a program at one or more locations within a target computing environment 110, and which remains installed (persists in storage). An installed event monitor may be downloaded and installed from datacenter 115.

In one embodiment, event monitoring includes network device discovery and/or mapping. As an example, the event monitor may ping various devices to determine the size of a local network and/or discover what type of Internet Protocol (IP) addresses respond on a local network. In one embodiment, the event monitor further determines hardware within a target computing environment 110 including, but not limited to: memory, processors, motherboards, hard drives, input/output (I/O) devices, etc. In one embodiment, the event monitor performs port scanning and gathers event data 119 from a target computing environment which indicates what services (e.g., type of operating system) are available at/within the target computing environment 110.

In an embodiment, the event monitor determines the installed software 111 within a target computing environment 110. This can also involve the event monitor gathering configuration information 112 (112-1, 112-2, 112-n) of installed software 111 (111-1, 111-2, 111-n) on machines and virtual machines in a target computing environment 110 (110-1, 110-2, 110-n).

In one embodiment, the event monitor determines management information associated with a target computing environment 110 (e.g., windows management classes). For example, in an embodiment, the event monitor may determine how exposed a target computing environment 110 is to security problems. In an embodiment, File and Registry forensics are used to determine the existence and state of operating system components. For example, the event monitor may determine whether Internet Information Service (IIS) is installed. In some embodiments, a plurality of system queries may be run to identify the type of target computing environment 110 and/or machine within a target computing environment 110 (e.g., laptop, desk top, tablet, server, a plurality of servers, etc.).

In an embodiment, the event monitor may be customized. In other words, a user may program the event monitor to determine whether certain particular components are included within a target computing environment 110 being monitored.

Sending Data to a Datacenter

In an embodiment, the output of an individual target computing environment 110 is event data 119 that is sent (e.g., forwarded, streamed, etc.) to datacenter 115. In one embodiment, for example, all event data 119-1, gathered by the event monitor of target computing environment 110-1 is packaged before it is sent to datacenter 115 in a single file transmission. In another embodiment, such event data e.g., 119-1 is streamed to datacenter 115. In such a case, a portion of event data 119-1 gathered from the event monitor may be sent to datacenter 115 as it occurs within target computing environment 110-1.

Figure 2:
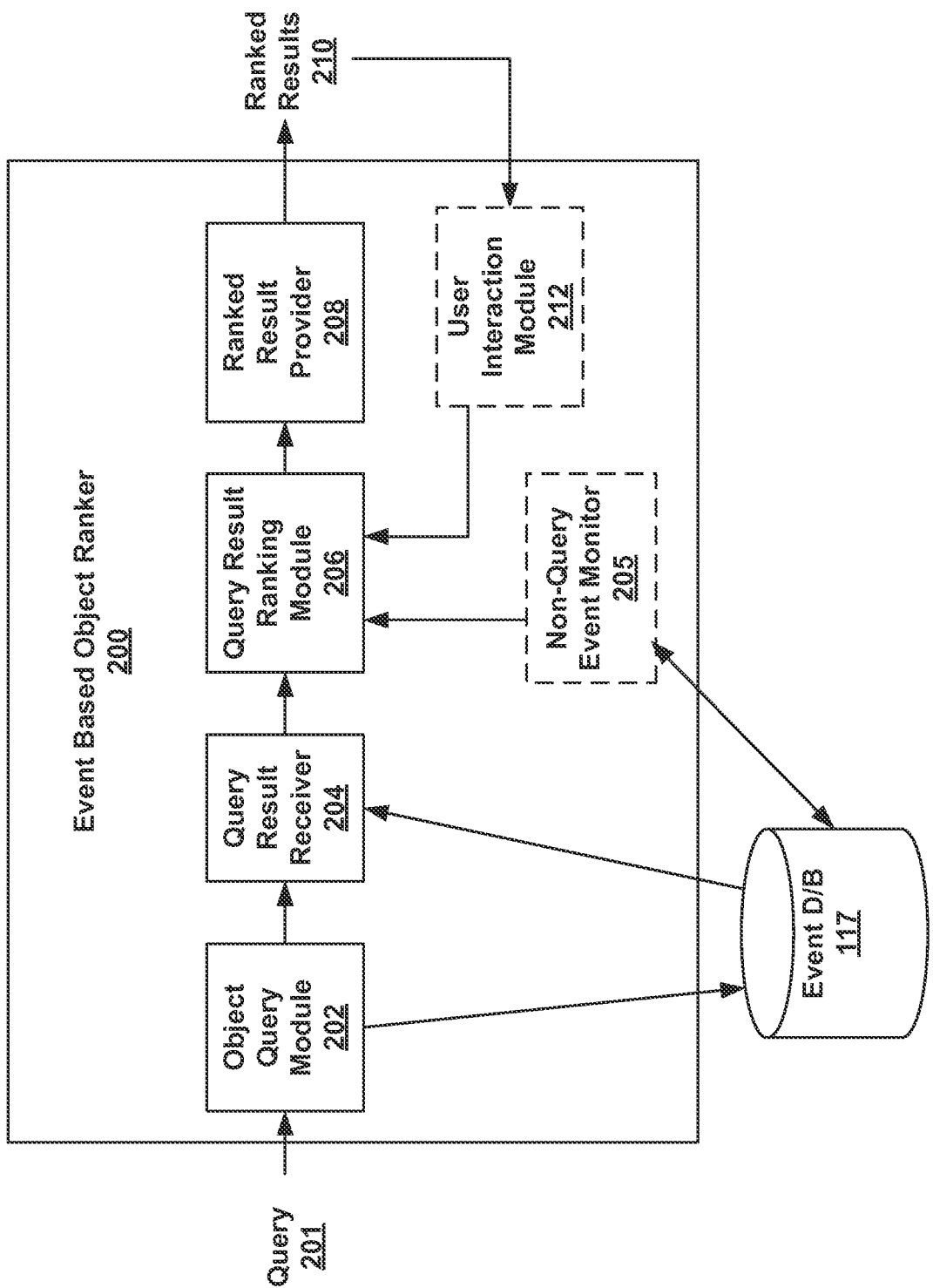
FIG. 2 is a block diagram of an event based object ranker, in accordance with an embodiment.

With reference now to FIG. 2, a block diagram of an event based object ranker 200 in accordance with one embodiment. In various embodiments, event based object ranker 200 is implemented on one or more processors, which may reside in datacenter 115, one or more target computing environments 110, and/or elsewhere. In one embodiment, event based object ranker 200 receives a query 201. In one embodiment, the query 201 may be a generic request for information about target computing environment 110. In another embodiment, the query 201 may be a specific request from an IT manager about certain aspects of the target computing environment 110. For example, a specific query 201 may be directed toward any machines in the target computing environment 110 that have at least 85% of their memory utilized.

Object query module 202 receives the query and then accesses an event database 117 to search for any events that match or are similar to the query 201. Query results receiver 204 receives the results from event database 117. For example, the results may be similar to results 204a of FIG. 3. In general, results 204a of FIG. 3 include results 1-n. Results 204a could be anywhere from a few to hundreds or even thousands depending upon the size of target computing environment 110 and the nature of the underlying query 201.

Query result ranking module 206 receives the results 204a from query results receiver 204. In one embodiment, query result ranking module 206 may also receive additional results from non-query event monitor 205. For example, if a physical or virtual machine within the target computing environment 110 were to go offline, the non-query event monitor 205 would provide the information to query result ranking module 206. A non-query event is shown at item 5 of results 204a.

Figure 3:
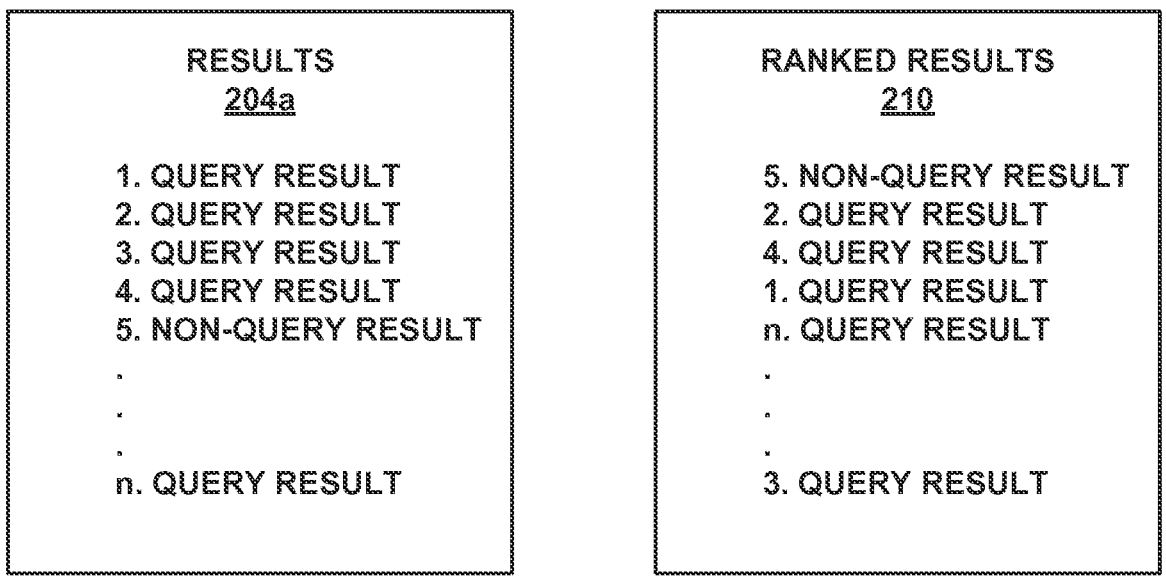
FIG. 3 is a block diagram of a query result list and a ranked query result list, in accordance with various embodiments.

Query result ranking module 206 will sort the events provided in results 204a such as shown in ranked results 210 of FIG. 3. For example, the query result ranking module 206 has sorted ranked results 210 to provide the user with a list that is organized based on the preferences described herein. The ranked results 210 are then transmitted via ranked result provider 208 in a user accessible format.

In one embodiment, the ranked results 210 are organized such that only a few, such as ten events, are shown per page. By only providing a limited number of results, a user will not be overwhelmed with event information. However, if the user wishes to see additional events, the user can simply scroll down or otherwise navigate to the additional results. Although a limited number of results are discussed, the number of readily viewable results may be user adjustable, or predefined.

Similarly, the way the ranked results 210 are presented may also be user adjustable or predefined. For example, some users may enjoy a list format of the events while others may prefer a flowchart type presentation, a spreadsheet, or the like. Moreover, the events may be presented with different levels of information initially provided. For example, a user may prefer only to have a single line item per event with a link to expand the information within an event. In contrast, another user may prefer to have an event title and then a small description that includes machine type, location, previous event occurrences, or the like.

In one embodiment, event based object ranker 200 also includes a user interaction module 212. In general, user interaction module 212 monitors a user's interactions with the ranked results 210. For example, if a user selects the first item in the list, then user interaction module 212 will provide no feedback or positive feedback to query result ranking module 206. However, if the user does not select the first item or one of the first few items, but instead scrolls farther down the list before selecting an event, then user interaction module 212 will provide the scrolling feedback to query result ranking module 206. In one embodiment, query result ranking module 206 will dynamically adjust the ranked results 210 based on the user scrolling feedback. In another embodiment, query result ranking module 206 will adjust the ranking preferences for forming ranked results 210 based on the user feedback. The ranking preferences may be adjusted per user or for the entire system.

For example, a user queries machine power usage, and the user scrolls down the list to view information about machines in Guam. The same user then queries about memory capacity and again the user scrolls down the list to view information about machines in Guam. User interaction module 212 would provide the information to query result ranking module 206. In so doing, if query result ranking module 206 received a query, from the same user, about software versions, query result ranking module 206 would rank results for machines in Guam to the top of the ranked results 210.

Example Methods of Operation

Figure 4:
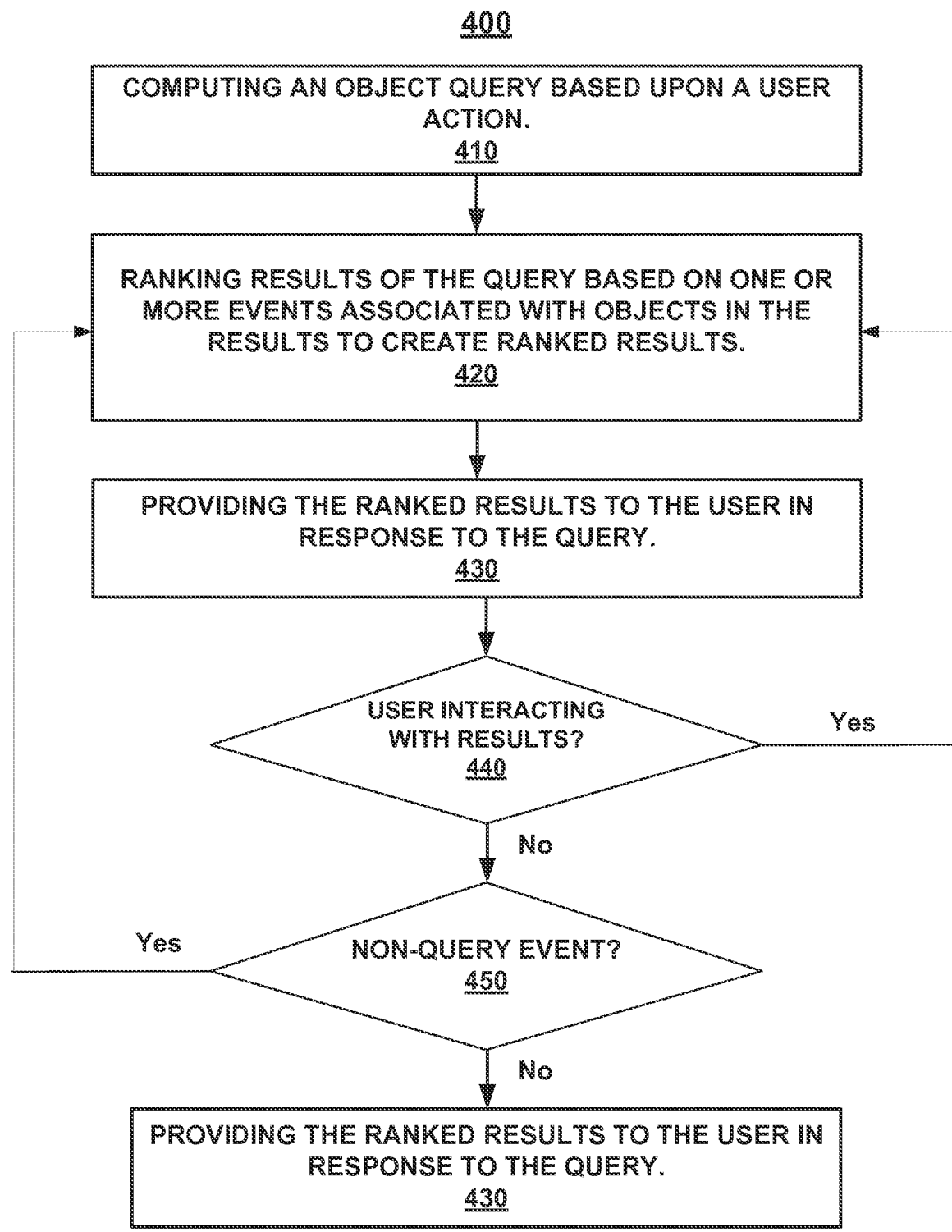
FIG. 4 is a flow diagram of a method of event based object ranking, in accordance with various embodiments.

The following discussion sets forth in detail the operation of some example methods of operation of embodiments. With reference to FIG. 4, flow diagram 400 illustrates example procedures used by various embodiments. Flow diagram 400 includes some procedures that, in various embodiments, are carried out by a processor under the control of computer-readable and computer-executable instructions. In this fashion, procedures described herein and in conjunction with flow diagram 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with target computer environments 110 and/or datacenter 115. The computer-readable and computer-executable instructions, which reside on tangible computer readable storage media, are used to control or operate in conjunction with, for example, one or some combination of processors of target computer environments 110 and/or datacenter 115. It is appreciated that the processor(s) may be physical or virtual or some combination (it should also be appreciated that a virtual processor is implemented on physical hardware).

Although specific procedures are disclosed in flow diagram 400, such procedures are examples. That is, embodiments are well suited to performing various other procedures or variations of the procedures recited in flow diagram 400. Likewise, in some embodiments, the procedures in flow diagram 400 may be performed in an order different than presented and/or not all of the procedures described in the flow diagram may be performed. It is further appreciated that procedures described in flow diagram 400 may be implemented in hardware, or a combination of hardware with firmware and/or software.

FIG. 4 is a flow diagram 400 of a method of event based object ranking, in accordance with various embodiments.

At procedure 410 of flow diagram 400, in one embodiment, computes an object query based upon a user action. In one embodiment, the computing of object query 201 is based upon browsing interaction by the user within a dynamic system. For example, a user accesses target computing environment 110 and performs an action. As stated herein, the action may be generic, such as a review of events that affect the target computing environment 110. For example, the user may look at events such as, but not limited to, the powering on or off of a virtual machine, adding or removing of devices, various kinds of errors, the number of times an object is viewed or browsed, and the like.

In another embodiment, the computing of object query 201 is based upon a specific query actively provided by the user. For example, the user's action may be a specific query such as "fatal errors occurred?", "machines powered on", "display names changed?", and the like.

After the object query is determined, the target computing environment 110 (e.g., 110-1) is queried and data 119 (e.g., 119-1 from target computing environment 110-1) that has been collected, such as at event database 117, is reviewed for information responsive to the query and the responsive informant is collected into a result list such as results 204*a* of FIG. 3. In one embodiment, query 201 may be initiated from a central location by a user. In another embodiment, query 201 may be initiated from a machine remote from the target computing environment 110-1 being queried. In some embodiments, a user must provide credentials to launch a query, while in others the query may be carried out by the privileges and/or credentials inherent to the software that the user is using.

At procedure 420 of flow diagram 400, one embodiment ranks the results of the query based on one or more events associated with objects in the results to create ranked results 210.

For example, in one embodiment, each of the results 204*a* is assigned a coefficient of importance. The coefficient of importance may be based upon a relative importance assigned to an event type and may be a predetermined value. For example, a predefined coefficient of importance of the one or more events may be a default setting, a contextual importance, a dynamic adjustment, an adjustment by a user and the like.

Alternatively, the coefficient of importance may be based upon a relative importance assigned to an event type and may be a dynamic value based upon context of what action is being performed by the user. For example, one or more of the events may be weighted by the frequency of occurrence or the recency of occurrence. Similarly, weight may be given to object re-occurrence.

In another embodiment, the event based rank of an object could be combined with the object's other properties to produce an overall rank. For example, virtual machines that are bigger in size could be considered more important than the smaller ones. In one embodiment, since the events are occurring in a dynamic and constantly changing system, the events may be weighted to be more important or relevant than the static properties of the objects.

At procedure 430 of flow diagram 400, in one embodiment, ranked results 210 are provided to the user in response to the query 201. Although ranked results 210 are provided to the user at 430, the interaction and dynamic adjustment of the events on ranked results 210 are not necessarily stopped. Instead, additional adjustments to the ranked results 210 may be performed as described at 440 and 450 herein.

At procedure 440, and as shown in FIG. 2, user interaction with ranked results 210 may also be monitored and the ranked results 210 adjusted accordingly. In other words, certain events may be more important than others from the user's point of view (importance could also be seen as severity or criticality). User interaction module 212 would monitor the user's interaction with ranked results 210 and could provide feedback to query result ranking module 206 to automatically adjust these weights based on the user's response to the presented results. For example, based on what items a user happens to select (to view more details of) from ranked results 210, the weights for the types of events occurred on those objects could be bumped up relative to all the other event types.

At procedure 450, and as shown in FIG. 2, non-query event monitor 205 may also provide information that is outside of the query but may be important to the user. For example, the user query 201 may have been directed toward display names that have changed. However, after presenting ranked results 210, a power disruption may occur in some physical or virtual machines within the target computing environment 110. This non-query event would be pre-determined to be important to the user. As such, query result ranking module 206 would update ranked results 210 to provide the power disruption event information at, or close to, the top of the list to give the user the best chance of seeing and responding to the non-query event.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What we claim is:

1. A computer-implemented method of event based object ranking, the computer-implemented method comprising:
   receiving a request from a user, for computation of an object query, at a machine in a computing environment;
   accessing an event database to perform a search for any events that match the object query;
   receiving results of the search for any events that match the object query in the event database;
   automatically receiving, by said machine in said computing environment, one or more non-query events regarding information that is outside of said object query, said one or more non-query events derived without requiring a second request from said user,
      the one or more non-query events not being derived from said results of the search for the object query and said non-query events not related to said object query and said non-query events not related to said results of the events that match the object query, said one or more non-query events provided by a non-query event monitor, and wherein said information that is outside of said object query is pre-determined to be of importance to said user, said information that is outside of said object query is information not related to said object query;
   ranking, by said machine in said computing environment, the results of the events that match the object query and the one or more non-query events, to create ranked results that incorporate both the results of the events that match the object query and the one or more non-query events, said ranking performed by said computer; and
   providing, by said machine in said computing environment, the ranked results to the user in response to the object query.

2. The computer-implemented method of claim 1, wherein the computing the object query based upon the request comprises:
   computing, by said machine in said computing environment, the object query based upon browsing interaction by the user within said dynamic system.

3. The computer-implemented method of claim 1, wherein the computing the object query based upon the request comprises:
   computing, by said machine in said computing environment, the object query based upon a specific query actively provided by the user.

4. The computer-implemented method of claim 1, wherein the ranking results of the query based on one or more events associated with objects in the results to create ranked results comprises:
   assigning, by said machine in said computing environment, a coefficient of importance to each of the one or more events associated with an object of the results.

5. The computer-implemented method of claim 4, wherein the coefficient of importance is based upon a relative importance assigned to an event type of one or more events.

6. The computer-implemented method of claim 5, wherein the relative importance of the one or more events is predetermined.

7. The computer-implemented method of claim 6, wherein a predefined coefficient of importance of the one or more events is selected from a group consisting of: a default setting, a contextual importance, a dynamic adjustment and an adjustment by a user.

8. The computer-implemented method of claim 5, wherein the relative importance of the one or more events is dynamically based upon context of what action is being performed by the user.

9. The computer-implemented method of claim 1, wherein the one or more events are weighted, by said machine in said computing environment, by frequency of occurrence.

10. The computer-implemented method of claim 1, wherein the one or more events are weighted, by said machine in said computing environment, by recency of occurrence.

11. The computer-implemented method of claim 1, wherein the ranking, by said machine in said computing environment, is based upon number of the one or more events to occur with respect to an object with greater weight given to more recent events.

12. A non-transitory computer usable storage medium having instructions embodied therein that when executed causes a computer system to perform a method for event based object ranking, the method comprising:
receiving a request from a user, for computation of an object query, at a machine in a computing environment;
accessing an event database to search for any events that match the object query;
receiving results of the search for any events that match the object query in the event database;
automatically receiving, by said machine in said computing environment, one or more non-query events regarding information that is outside of said object query, said one or more non-query events derived without requiring a second request from said user,
the one or more non-query events not being derived from the results of the search for any events that match the object query and said non-query events not related to said object query and said non-query events not related to said results of the events that match the object query, said one or more non-query events provided by a non-query event monitor, and wherein said information that is outside of said object query is pre-determined to be of importance to said user, said information that is outside of said object query is information not related to said object query;
ranking, by said machine in said computing environment, the results of the events that match the object query and the one or more non-query events, based on one or more events associated with objects in the results to create ranked results that incorporate both the results of the events that match the object query and the one or more non-query events, said ranking performed by said computer; and
providing, by said machine in said computing environment, the ranked results to the user in response to the object query.

13. The non-transitory computer usable storage medium of claim 12, wherein the computing an object query comprises:
computing, by said machine in said computing environment, an object query based upon browsing interaction by the user within said dynamic system.

14. The non-transitory computer usable storage medium of claim 12, wherein the computing an object query comprises:
computing, by said machine in said computing environment, an object query based upon a specific query actively provided by the user.

15. The non-transitory computer usable storage medium of claim 12, wherein the ranking, by said machine in said computing environment, of said results of the query based on one or more events associated with objects in the results to create ranked results comprises:
assigning, by said machine in said computing environment, a coefficient of importance to each of the one or more events associated with an object of the results, wherein the coefficient of importance is based upon a relative importance assigned to an event type of one or more events.

16. The non-transitory computer usable storage medium of claim 12, wherein the events are weighted, by said machine in said computing environment, from a group consisting of: a pre-determined relative importance, a dynamic importance based upon context of what action is being performed by the user, a frequency of occurrence and a recency of occurrence.

17. The non-transitory computer usable storage medium of claim 12, wherein the ranking, by said machine in said computing environment, is based upon number of the one or more events to occur with respect to an object with greater weight given to more recent events.

18. The non-transitory computer usable storage medium of claim 12, wherein a predefined coefficient of importance of said events is selected from a group consisting of: a default setting, a contextual importance, a dynamic adjustment and an adjustment by the user.

* * * * *